(12) United States Patent
Fukuoka

(10) Patent No.: US 11,133,557 B2
(45) Date of Patent: Sep. 28, 2021

(54) ON-VEHICLE BATTERY PACK

(71) Applicant: NISSAN MOTOR CO., LTD., Yokohama (JP)

(72) Inventor: Manabu Fukuoka, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 16/617,070

(22) PCT Filed: Apr. 5, 2018

(86) PCT No.: PCT/JP2018/014579
§ 371 (c)(1),
(2) Date: Nov. 26, 2019

(87) PCT Pub. No.: WO2018/221002
PCT Pub. Date: Dec. 6, 2018

(65) Prior Publication Data
US 2020/0106066 A1    Apr. 2, 2020

(30) Foreign Application Priority Data

May 30, 2017    (JP) .............................. JP2017-106701

(51) Int. Cl.
*H01M 50/30*    (2021.01)
*B60L 50/64*    (2019.01)
(Continued)

(52) U.S. Cl.
CPC ........... *H01M 50/394* (2021.01); *B60L 50/64* (2019.02); *B60L 50/66* (2019.02); *H01M 50/20* (2021.01); *H01M 2220/20* (2013.01)

(58) Field of Classification Search
CPC ............ H01M 2/1264; H01M 2/1077; H01M 50/394; H01M 50/20; B60L 50/64; B60L 50/66

See application file for complete search history.

(56) References Cited

U.S. PATENT DOCUMENTS

2010/0009244 A1    1/2010    Murata
2011/0091749 A1    4/2011    Chow
(Continued)

FOREIGN PATENT DOCUMENTS

JP    2008-251308 A    10/2008
JP    2015-2166 A    1/2015
(Continued)

OTHER PUBLICATIONS

WO2014065110A1 Original and Translation from Espacenet (Year: 2014).*

*Primary Examiner* — Nathanael T Zemui
(74) *Attorney, Agent, or Firm* — Foley & Lardner LLP

(57) ABSTRACT

An on-vehicle battery pack in which a battery module is housed with a gas release plane facing an inner surface of a sidewall portion of a pack case with a space therebetween, and a restriction plate includes a first plate portion protruding toward the sidewall portion at a height position higher than at least an upper edge of the gas release plane, and a second plate portion extending downwards in the space continuously from a front edge of the first plate portion in a direction in which the first plate portion protrudes.

7 Claims, 7 Drawing Sheets

(51) Int. Cl.
    *B60L 50/60*     (2019.01)
    *H01M 50/20*     (2021.01)

(56) References Cited

U.S. PATENT DOCUMENTS

| | | |
|---|---|---|
| 2013/0342168 A1 | 12/2013 | Okumura et al. |
| 2013/0344371 A1* | 12/2013 | Kinoshita ............ H01M 10/615 429/120 |
| 2014/0030563 A1* | 1/2014 | Hoshi ............... H01M 10/4207 429/72 |
| 2016/0149192 A1 | 5/2016 | Motokawa |
| 2016/0204404 A1* | 7/2016 | Shimizu .............. H01M 2/1077 429/82 |
| 2017/0033343 A1 | 2/2017 | Miyawaki |
| 2018/0029493 A1* | 2/2018 | Kobayashi ............ H01M 2/206 |
| 2018/0034014 A1* | 2/2018 | Ichikawa ................ B60L 50/66 |

FOREIGN PATENT DOCUMENTS

| | | | |
|---|---|---|---|
| JP | 2015-118811 A | 6/2015 | |
| JP | 2017-33721 A | 2/2017 | |
| WO | WO 2014/065110 A1 | 5/2014 | |
| WO | WO-2014065110 A1 * | 5/2014 | ............. H01M 2/12 |
| WO | WO 2015/019570 A1 | 2/2015 | |
| WO | WO-2016/014831 A1 | 1/2016 | |

* cited by examiner

ON-VEHICLE BATTERY PACK

TECHNICAL FIELD

The present invention relates to an on-vehicle battery pack.

BACKGROUND ART

Battery packs mounted on vehicles such as electric vehicles include unit cells housed in a pack case. If a gas is generated inside a unit cell due to some reason and the internal pressure of the unit cell abnormally rises, the gas is discharged from the unit cell into the pack case (see Patent Literature 1).

CITATION LIST

Patent Literature

Patent Literature 1: Japanese Patent Application Publication No. 2008-251308

SUMMARY OF INVENTION

Technical Problem

The gas discharged from the unit cell is hot. Since the gas rises directly to an upper portion of the inside of the pack case, the top of the pack case becomes hot. For this reason, on-vehicle components disposed in proximity to the top of the pack case, e.g., resin components, a spare tire, and so on may possibly be thermally deteriorated.

An object of the present invention is to provide an on-vehicle battery pack capable of keeping the top of its pack case from becoming hot as a result of discharge of a gas from a unit cell.

Solution to Problem

An on-vehicle battery pack according to the present invention includes: a battery module with a unit cell housed in a module case, a specific plane of the module case being set as a gas release plane from which to release a gas discharged from the unit cell; and a pack case in which the battery module is housed; and a restriction plate which keeps the gas released from the gas release plane from rising directly to an upper portion of inside of the pack case. The battery module is housed with the gas release plane facing an inner surface of a sidewall portion of the pack case with a space therebetween. The restriction plate includes a first plate portion protruding toward the sidewall portion at a height position higher than at least an upper edge of the gas release plane, and a second plate portion extending downwards in the space continuously from a front edge of the first plate portion in a direction in which the first plate portion protrudes.

DESCRIPTION OF EMBODIMENTS

Figure 1:
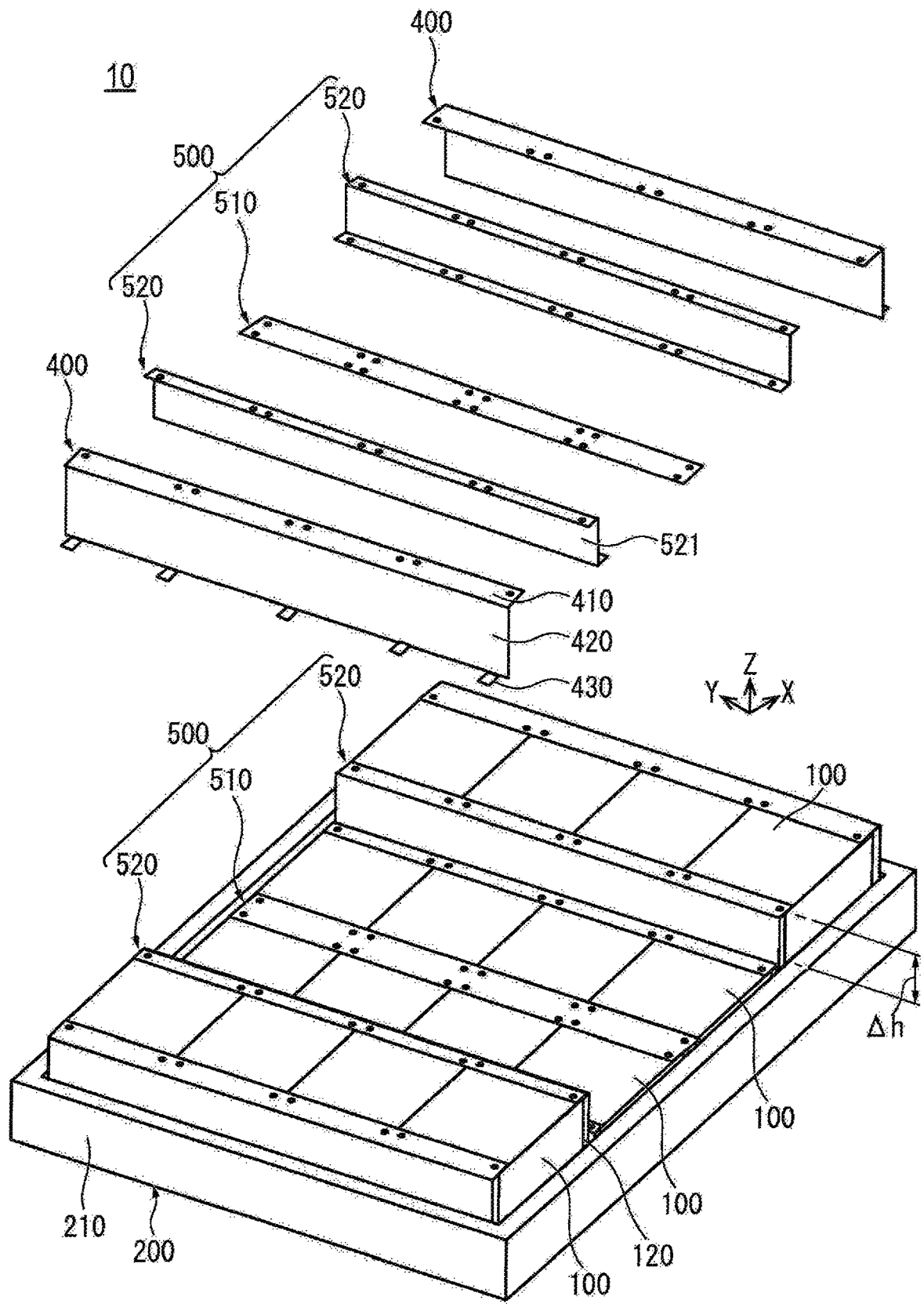
FIG. 1 is a perspective view illustrating a main part of an on-vehicle battery pack.

Embodiments of the present invention will be described below with reference to the accompanying drawings. In the drawings, identical members are denoted by the same reference sign and overlapping description is omitted. In the drawings, the sizes and proportions of members may be exaggerated to facilitate understanding of the embodiments and differ from the actual sizes and proportions.

The X, Y, and Z axes given in some drawings indicate the orientation of an on-vehicle battery pack. The X axis represents the vehicle front-rear direction (the rear side of the vehicle is the positive side while the front side is the negative side), the Y axis represents the vehicle width direction (right-left direction), and the Z axis represents the vertical direction.

Figure 2:
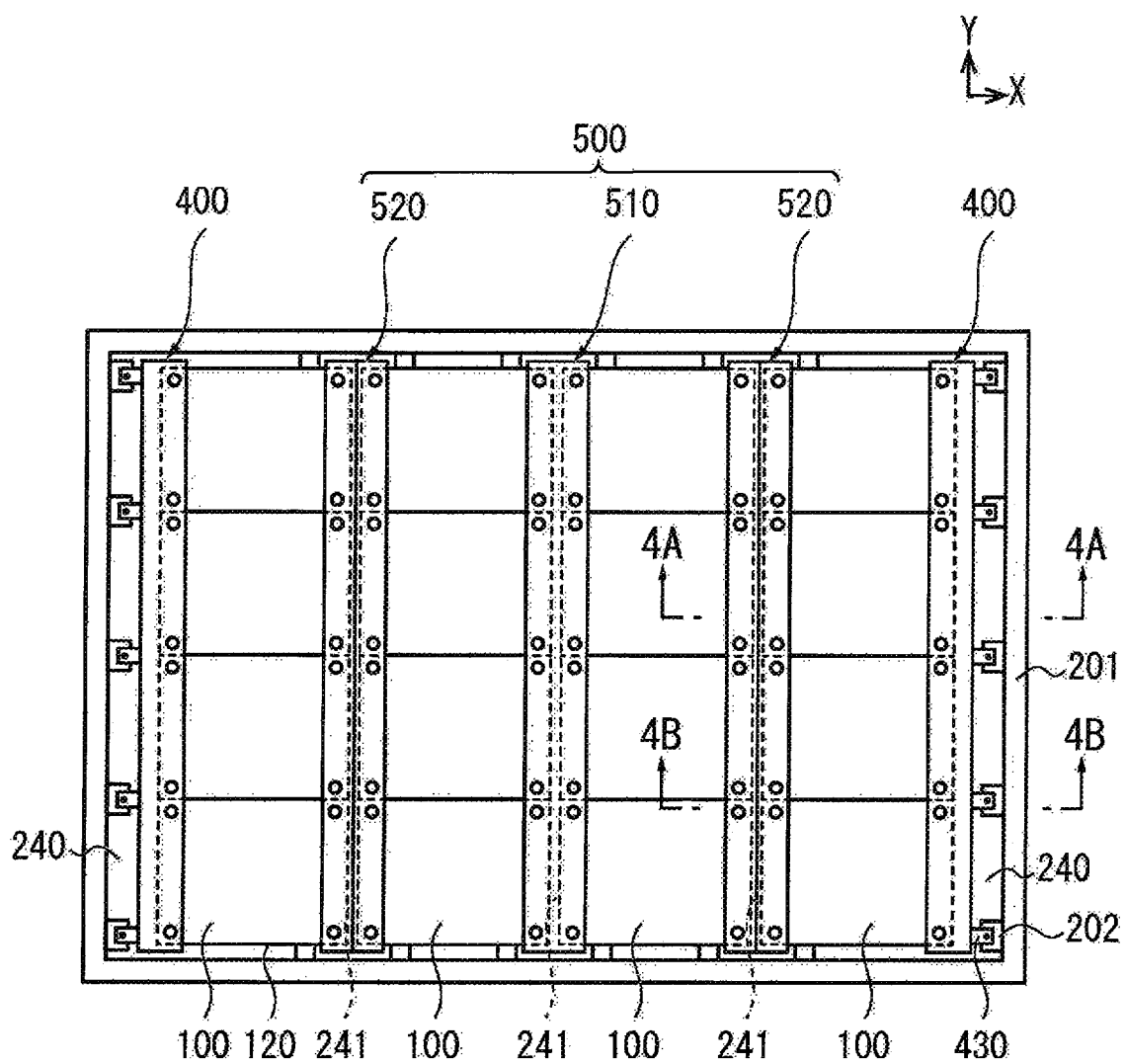
FIG. 2 is a plan view illustrating the battery pack.
Figure 3:
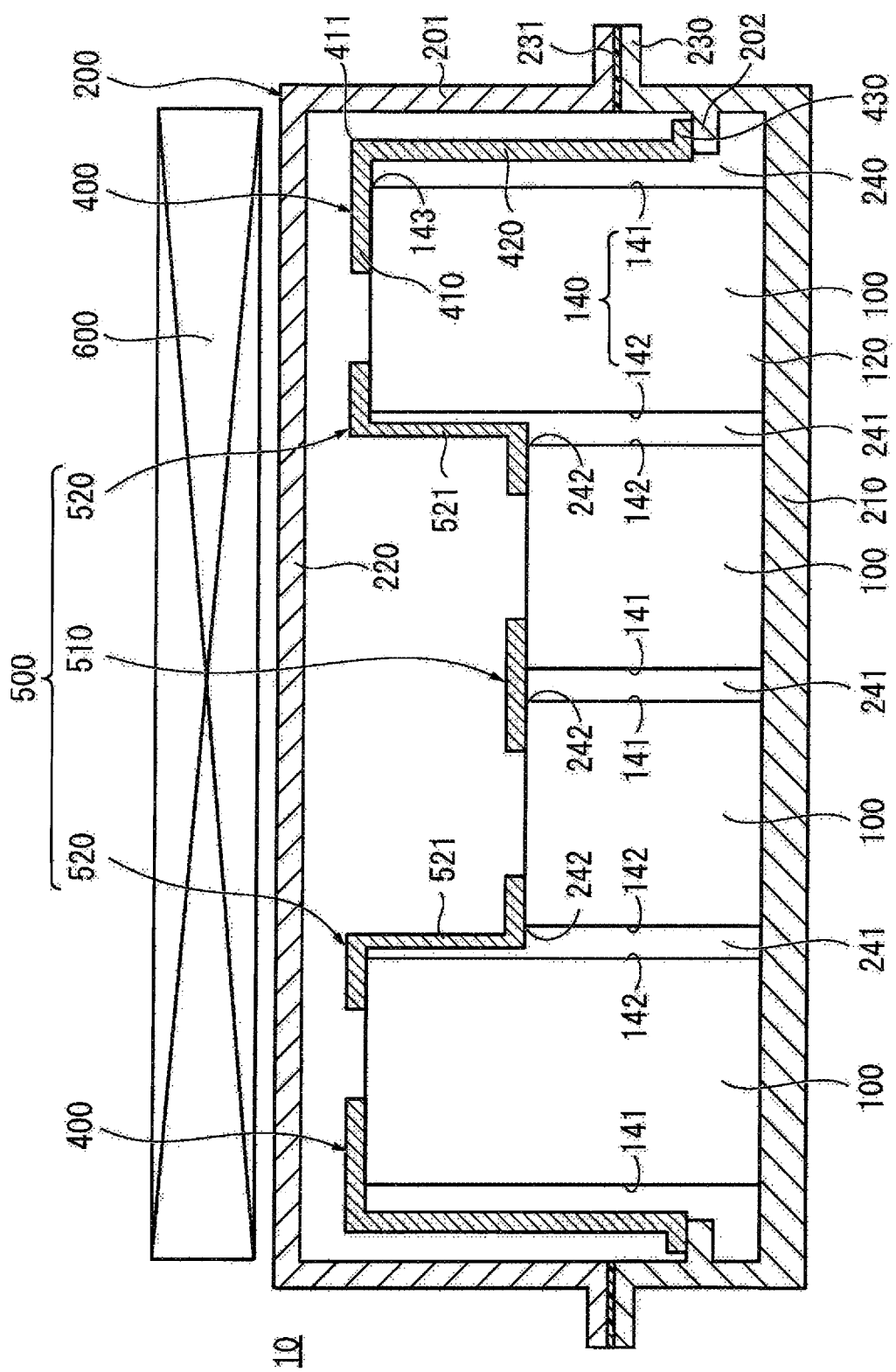
FIG. 3 is a cross-sectional view schematically illustrating the main part of the battery pack.
Figure 4A:
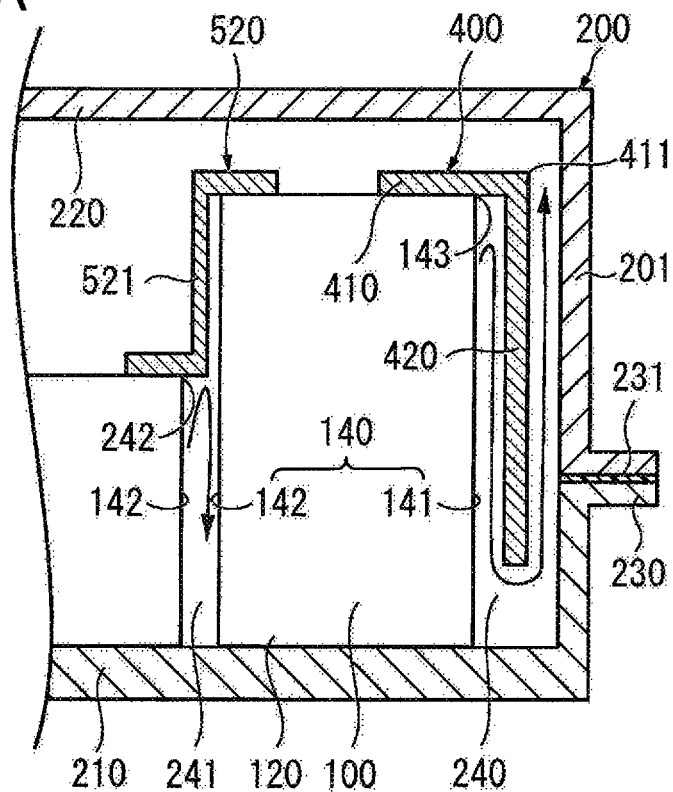
FIG. 4A is a cross-sectional view along line 4A-4A in FIG. 2.
Figure 4B:
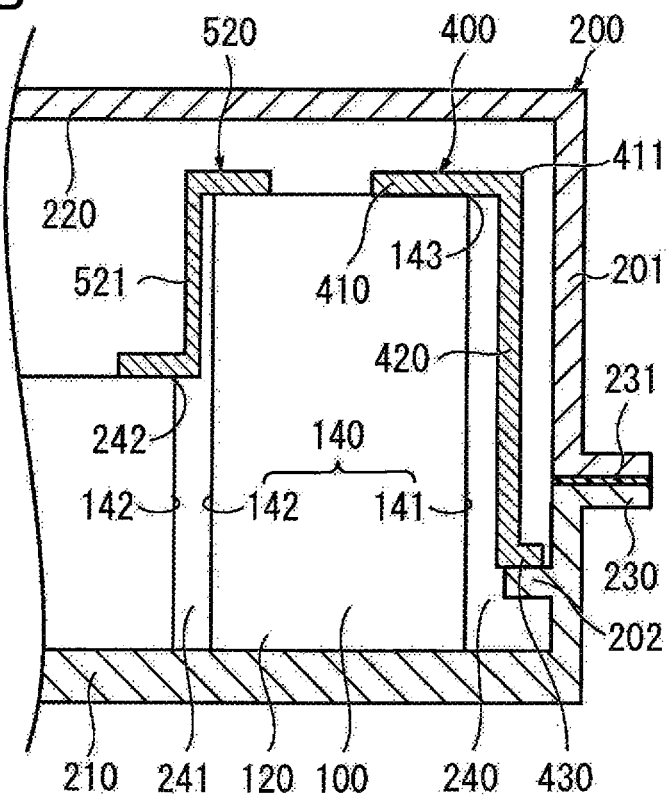
FIG. 4B is a cross-sectional view along line 4B-4B in FIG. 2.
Figure 6:
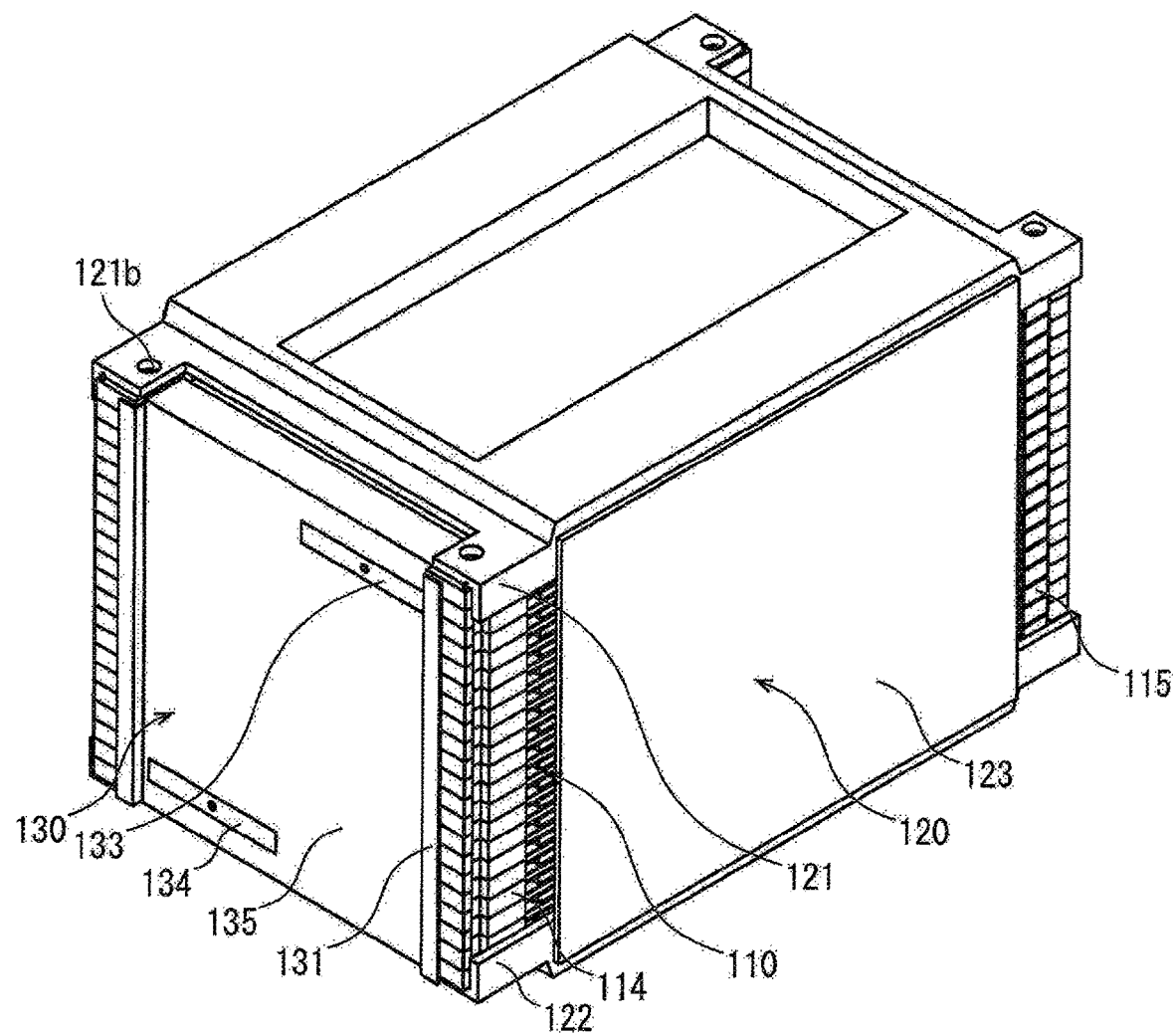
FIG. 6 is a perspective view illustrating a battery module.
Figure 7:
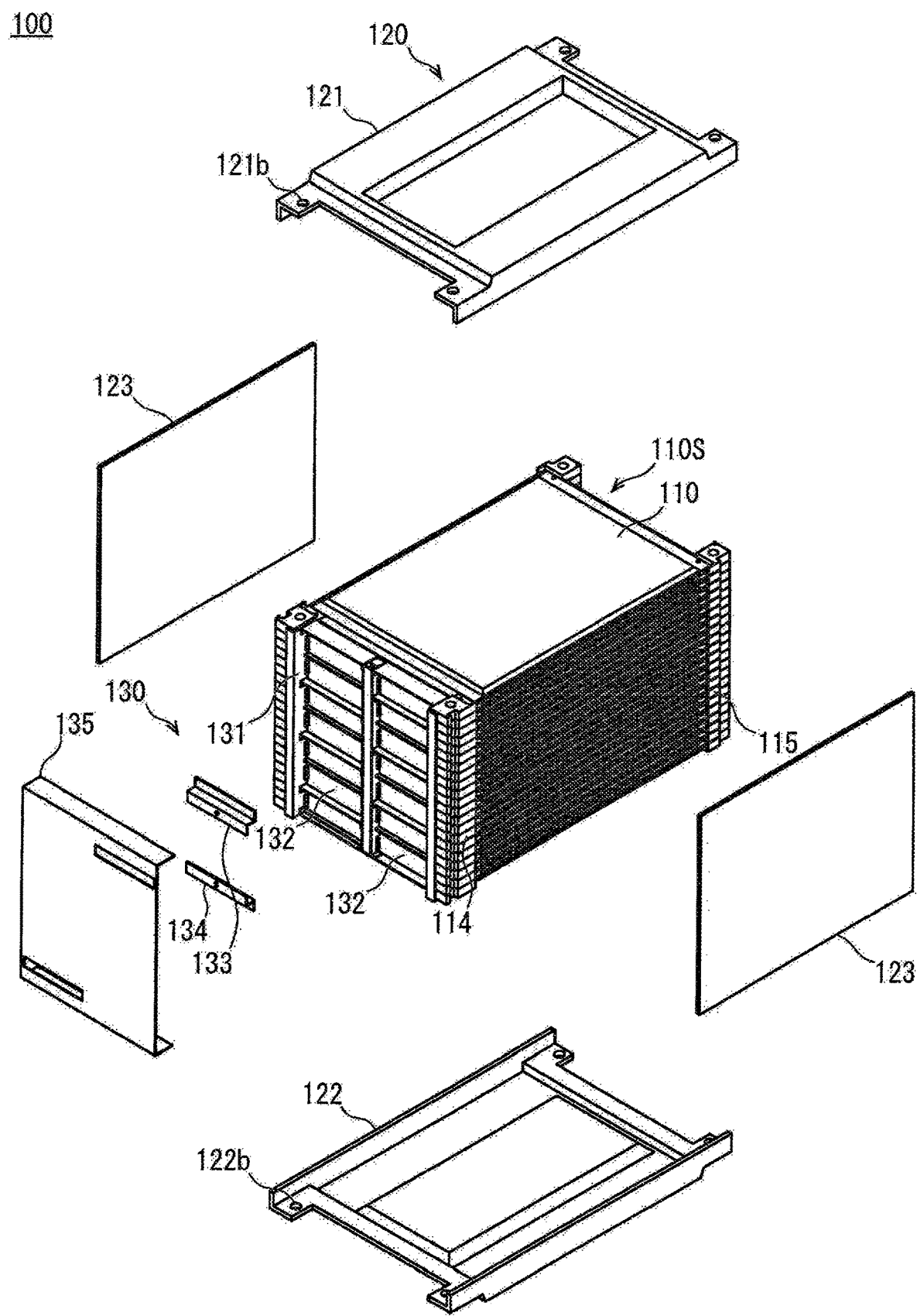
FIG. 7 is a perspective view illustrating the battery module illustrated in FIG. 6 with some parts disassembled.

FIG. 1 is a perspective view illustrating a main part of an on-vehicle battery pack 10. FIG. 2 is a plan view illustrating the battery pack 10. FIG. 3 is a cross-sectional view schematically illustrating the main part of the battery pack 10. FIG. 4A is a cross-sectional view along line 4A-4A in FIG. 2. FIG. 4B is a cross-sectional view along line 4B-4B in FIG. 2. FIG. 6 is a perspective view illustrating a battery module 100. FIG. 7 is a perspective view illustrating the battery module 100 illustrated in FIG. 6 with some parts disassembled.

Referring to FIGS. 1, 2, 3, 4A, and 4B, to briefly describe the on-vehicle battery pack 10, it includes: battery modules 100 with unit cells 110 housed in a module case 120, specific planes of the module case 120 being set as gas release planes 140 from which to release a gas discharged from any of the unit cells 110; and a pack case 200 in which the battery modules 100 are housed. The battery pack 10 further includes restriction plates 400 that prevent the gas released from the gas release planes 140 from rising directly to the upper portion of the inside of the pack case 200. Here, the rise of the gas directly to an upper portion of the inside of the pack case 200 means that the gas rises without descending after being released from the gas release planes 140. Some battery modules 100 are housed with a gas release plane 140 facing the inner surface of a sidewall portion 201 of the pack case 200 with a space 240 therebetween. Each restriction plate 400 includes: a first plate portion 410 protruding toward the sidewall portion 201 at a height position higher than at least upper edges 143 of the gas release planes 140; and a second plate portion 420 extending downwards in the space 240 continuously from a front edge 411 of the first plate portion 410 in the direction in which the first plate portion 410 protrudes. As illustrated in FIG. 1, a plurality of battery modules 100 are housed in the pack case 200 side by side in both the vehicle width direction (Y axis) and the vehicle front-rear direction (X axis). Meanwhile, the rows of battery modules 100 arrayed along the vehicle width direction will be referred to as the first row, the second row, the third row, and the fourth row in this order from the front side of the vehicle (the left side in FIGS. 2 and 3). Details will now be described.

Referring to FIGS. 6 and 7, in each battery module 100, a stack 110S as a plurality of flat unit cells 110 stacked on one another is housed in the module case 120. In the battery module 100 in this embodiment, a pair of opposite planes of the module case 120 are set as the gas release planes 140. In FIGS. 6 and 7, the plane on the near side to the left and the plane on the far side to the right are the gas release planes 140. A gas discharged from any of the unit cells 110 is released from the gas release plane 140 on the near side to the left and the gas release plane 140 on the far side to the right. The illustrated module case 120 is formed of four plate members and functions also as a pressing unit that presses the stack 110S. The plurality of unit cells 110 are electrically connected to each other by a bus bar unit 130 in the state of being pressed by the module case 120.

Each unit cell 110 is, for example, a lithium-ion secondary battery including: a cell body of a rectangular shape in a plan view obtained, for example, by sealing a power generation element formed by stacking a positive plate and a negative plate with a separator therebetween in a bag-shaped exterior member made of a laminate film along with an electrolyte; and positive and negative electrode tabs as positive and negative output terminals connected to the power generation element inside the exterior member and led out from one side of the cell body to the outside of the exterior member. Each unit cell 110 is stacked in a state where the side of the cell body with the electrode tabs is supported by a pair of first spacers 114 while the side of the cell body without the electrode tabs is supported by a pair of second spacers 115.

The module case 120 includes an upper pressing plate 121 and a lower pressing plate 122 that press the power generation elements (not illustrated) of the unit cells 110 in the stack 110S from the top and bottom, and a pair of side plates 123 that fix the upper pressing plate 121 and the lower pressing plate 122 in the state of pressing the stack 110S. The upper pressing plate 121 includes locating holes 121b to insert fastening bolts for fixing the battery module 100 to the pack case 200. The locating holes 121b are through-holes and bored in the four corners of the upper pressing plate 121. The lower pressing plate 122 includes locating holes 122b to insert fastening bolts, like the upper pressing plate 121. The pair of side plates 123 are welded to the upper pressing plate 121 and the lower pressing plate 122. The constituent material of the module case 120 is not particularly limited as long as the material is capable of withstanding a hot gas discharged from any of the unit cells 110. For example, the module case 120 can be made from stainless steel or the like.

The bus bar unit 130 includes: bus bars 132 electrically connecting the electrode tabs of the unit cells 110 arranged next to each other in the vertical direction; bus bar holders 131 holding the plurality of bus bars 132 together; and a protection cover 135 protecting the bus bars 132. The bus bar unit 130 further includes: an anode-side terminal 133 through which the anode-side end of the plurality of electrically connected unit cells 110 is exposed to an external input-output terminal; and a cathode-side terminal 134 through which the cathode-side end is exposed to an external input-output terminal.

Referring to FIGS. 1 and 3, the pack case 200 includes: an upper case 220 in a bottomed box shape opening on the lower side; a lower case 210 in a bottomed box shape opening on the upper side; and a sealing portion 230 at which the outer peripheries of the opening portions of the upper and lower cases 220 and 210 are connected with a sealing member 231 therebetween. The lower case 210 is bolted to a bottom part of the vehicle body not illustrated. The upper case 220 is bolted at its periphery to the periphery of the lower case 210. The sealing member 231 is made of a rubber material, for example. A weak portion (not illustrated) is provided at a part of the sealing portion 230. If the pressure inside the pack case 200 rises abnormally due to a gas discharged from any of the unit cells 110, the sealing function of the sealing portion 230 drops at the weak portion, so that the gas is discharged to the outside. A gas release valve that opens when a set pressure is reached or exceeded may be provided to the pack case 200 instead of forming the weak portion at a part of the sealing portion 230.

In the illustrated embodiment, 16 battery modules 100 in total are housed in the pack case 200 such that 4 rows of 4 battery modules 100 arrayed in the vehicle width direction are arranged side by side in the vehicle front-rear direction. As mentioned above, in each battery module 100, a pair of opposite planes of the module case 120 are set as the gas release planes 140. For the sake of description, among the pair of opening planes of the module case 120, the opening plane on the side without the bus bar unit 130 will be referred to as "first gas release plane 141" while the opening plane on the side with the bus bar unit 130 will be referred to as "second gas release plane 142".

As illustrated in FIGS. 2 and 3, the battery modules 100 in the first row are housed with the first gas release plane 141 facing the inner surface of the sidewall portion 201 of the pack case 200 on the left side in FIGS. 2 and 3 with a space 240 therebetween. Likewise, the battery modules 100 in the fourth row are housed with the first gas release plane 141 facing the inner surface of the sidewall portion 201 of the pack case 200 on the right side in FIGS. 2 and 3 with a space 240 therebetween. The battery modules 100 in the first row and the second row are disposed with their second gas release planes 142 facing each other with a clearance 241 therebetween. Likewise, the battery modules 100 in the third row and the fourth row are disposed with their second gas release planes 142 facing each other with a clearance 241 therebetween. The battery modules 100 in the second row and the third row are disposed with their first gas release planes 141 facing each other with a clearance 241 therebetween.

Some battery modules 100 lying adjacent to each other in the vehicle front-rear direction have different height dimensions (Z axis) due to the difference in number of unit cells 110 stacked. The battery modules 100 in the first row and the fourth row have a larger number of unit cells 110 stacked than the battery modules 100 in the second row and the third row. For this reason, the battery modules 100 in the first row and the fourth row have a larger height dimension than the battery modules 100 in the second row and the third row (see Δh in FIG. 1). There is a level difference between the battery modules 100 in the first row and the battery modules 100 in the second row and between the battery modules 100 in the third row and the battery modules 100 in the fourth row. The battery modules 100 in the second row and the third row have the same number of unit cells 110 stacked and have the same height dimension.

The restriction plates 400 are attached to the battery modules 100 in the first row and the fourth row. Each restriction plate 400 includes: the first plate portion 410, protruding toward the sidewall portion 201 at a height position higher than at least the upper edge 143 of the first gas release plane 141; and the second plate portion 420, extending downwards in the space 240 continuously from the front edge 411 of the first plate portion 410 in the direction in which the first plate portion 410 protrudes. The first plate portion 410 is fixed to the upper surface of the module case 120 with bolts or the like. The constituent material of the restriction plate 400 is not particularly limited as long as the material is capable of withstanding a hot gas discharged from any of the unit cells 110. For example, like the module case 120, the restriction plate 400 can be made from stainless steel or the like.

As illustrated in FIGS. 3, 4A, and 4B, the second plate portion 420 of each restriction plate 400 extends to a position lower than the sealing portion 230 in order to prevent a gas released from the first gas release plane 141 from directly hitting the sealing portion 230.

As illustrated in FIGS. 1, 2, 3, and 4B, each restriction plate 400 is fixed to the pack case 200. The restriction plate 400 includes a fixing piece 430 protruding toward the sidewall portion 201 from the lower edge of the second plate portion 420. A protrusion 202 on which to place the fixing piece 430 is formed on the inner surface of the sidewall portion 201 of the lower case 210. The fixing piece 430 is fastened to the protrusion 202 with bolts or the like not illustrated. As a result, the restriction plate 400 is fixed to the pack case 200.

As illustrated in FIGS. 1 and 2, the first row and the fourth row include a plurality of battery modules 100 (four in each row in the illustrated example) disposed side by side in the pack case 200. In such a case, each of the battery modules 100 is equipped with a restriction plate 400, and these restriction plates 400 are connected to each other. Here, being "connected to each other" includes a state in which a restriction plate 400 is formed as a single integrated body as illustrated, and also a state in which separately formed restriction plates 400 are bolted or welded together.

Also, as illustrated in FIG. 2, in the case where a plurality of battery modules 100 are disposed side by side in the pack case 200 like the first row and the fourth row, the first gas release planes 141 of all four battery modules 100 in the first row face the inner surface of one sidewall portion 201 (the left sidewall portion 201). Likewise, the first gas release planes 141 of all four battery modules 100 in the fourth row face the inner surface of one sidewall portion 201 (the right sidewall portion 201).

A clearance 241 is present between the first row and the second row, between the second row and the third row, and between the third row and the fourth row. The battery pack 10 further includes cover members 500 closing upper end openings 242 formed at the upper ends of the clearances 241. The cover members 500 in this embodiment are a first cover member 510 closing the upper end opening 242 between the second row and the third row, and second cover members 520 closing the upper end opening 242 between the first row and the second row and the upper end opening 242 between the third row and the fourth row.

The battery modules 100 in the second row and the third row have the same height dimension. For this reason, the first cover member 510 has a substantially flat plate shape.

On the other hand, the battery modules 100 in the first row and the second row have different height dimensions, and the battery modules 100 in the third row and the fourth row have different height dimensions as well. For this reason, each second cover member 520 includes a third plate portion 521 extending upwards and facing the second gas release planes 142 of the taller ones of the battery modules 100.

The constituent material of the cover members 500 is not particularly limited as long as the material is capable of withstanding a hot gas discharged from any of the unit cells 110. Like the restriction plates 400, the cover members 500 can be made from stainless steel or the like.

A plurality of battery modules 100 (four in each row in the illustrated example) are disposed side by side in the pack case 200. In such a case, each of the battery modules 100 is equipped with a cover member(s) 500, and these cover members 500 are connected to each other. Here, being "connected to each other" includes a state in which a cover member 500 is formed as a single integrated body as illustrated, and also a state in which separately formed cover members 500 are bolted or welded together.

Next, operation in a situation where a gas is discharged from a unit cell 110 will be described with reference to FIGS. 3, 4A, and 4B.

If a gas is discharged from a unit cell 110 included in a battery module 100 in the first row or the fourth row, the gas released from the first gas release plane 141 is prevented from rising directly to the upper portion of the inside of the pack case 200 by the first plate portion 410 of the restriction plate 400. The gas flows downwards along the second plate portion 420. Upon reaching the lower end of the second plate portion 420, the gas reverses its flow direction to an upward direction and flows toward the upper portion of the inside of the pack case 200 along the sidewall portion 201 of the pack case 200 (see an arrow in FIG. 4A).

If a gas is discharged from a unit cell 110 included in a battery module 100 in the first row or the fourth row, the gas released from the second gas release plane 142 is prevented from rising directly to the upper portion of the inside of the pack case 200 since the upper end opening 242 of the clearance 241 is closed by the second cover member 520. The second cover member 520 includes the third plate portion 521, thereby reliably preventing the gas from rising directly to the upper portion although the adjacent battery modules 100 have different height dimensions. The gas then passes other portions to flow to the upper portion of the inside of the pack case 200 (see an arrow in FIG. 4A).

If a gas is discharged from a unit cell 110 included in a battery module 100 in the second row or the third row, the gas released from the first gas release plane 141 is prevented from rising directly to the upper portion of the inside of the pack case 200 since the upper end opening 242 of the clearance 241 is closed by the first cover member 510. The gas released from the second gas release plane 142 is prevented from rising directly to the upper portion of the inside of the pack case 200 since the upper end opening 242 of the clearance 241 is closed by the second cover member 520.

As described above, if a gas is discharged from any of the unit cells 110, the hot gas does not directly hit the upper case 220. As the released gas flows through a circumvention path, the gas temperature drops to a certain extent. This keeps the top of the pack case 200 from becoming hot. Hence, an on-vehicle component 600 (see FIG. 3) disposed in proximity to the top of the pack case 200 can be prevented from being thermally deteriorated. The on-vehicle component 600 is, for example, a resin component, a spare tire, or the like.

The 16 battery modules 100 in total, housed in the pack case 200, are coupled to each other by the restriction plates 400, the first cover member 510, and the second cover members 520. For this reason, the adjacent battery modules 100 are kept from moving relative to each other in both the vehicle width direction and the vehicle front-rear direction. Since the restriction plates 400 are fixed to the pack case 200, the plurality of battery modules 100 are kept from moving inside the pack case 200.

As described above, the on-vehicle battery pack 10 in this embodiment includes the restriction plates 400, which keep a gas released from a gas release plane 140 from rising directly to the upper portion of the inside of the pack case 200. Some battery modules 100 are housed with a gas release plane 140 facing the inner surface of a sidewall portion 201 of the pack case 200 with a space 240 therebetween. Each restriction plate 400 includes: the first plate portion 410, protruding toward the sidewall portion 201 at a height position higher than at least the upper edge 143 of the gas release plane 140; and the second plate portion 420, extending downwards in the space 240 continuously from the front edge 411 of the first plate portion 410 in the direction in which the first plate portion 410 protrudes.

With this configuration, a gas released from the gas release plane 140 is prevented from rising directly to the upper portion of the inside of the pack case 200 by the first plate portion 410 of the restriction plate 400. This can keep the top of the pack case 200 from becoming hot. Hence, the on-vehicle component 600, disposed in proximity to the top of the pack case 200, can be prevented from being thermally deteriorated.

The pack case 200 includes the upper case 220, the lower case 210, and the sealing portion 230, and the second plate portion 420 of each restriction plate 400 extends to a position lower than the sealing portion 230.

With this configuration, a gas released from the gas release plane 140 can be prevented from directly hitting the sealing portion 230. Hence, the sealing member 231, whose thermal resistance can be improved only to a limited extent, can be prevented from being thermally deteriorated.

The restriction plates 400 are fixed to the pack case 200.

With this configuration, the battery modules 100 are kept from moving inside the pack case 200. Besides the function of restricting the flow of a gas, the restriction plates 400 also have the function of supporting the battery modules 100. This makes it possible to omit dedicated components only having the function of supporting the battery modules 100. By reducing the number of components, the cost and weight of the battery pack 10 can be reduced.

In the case where a plurality of battery modules 100 are disposed side by side in the pack case 200, the plurality of battery modules 100 are each equipped with a restriction plate 400, and these restriction plates 400 are connected to each other.

With this configuration, the adjacent battery modules 100 are kept from moving relative to each other.

In the case where a plurality of battery modules 100 are disposed side by side in the pack case 200, a gas release plane 140 of every one of the plurality of battery modules 100 faces the inner surface of one sidewall portion 201.

With this configuration, the plurality of battery modules 100 have the same gas discharge direction. This makes it possible to simplify the shape of each restriction plate 400 and also reduce the number of restriction plates 400 to be installed. Accordingly, the cost and weight of the battery pack 10 can be reduced.

In each battery module 100, a pair of opposite planes of the module case 120 are set as the gas release planes 140 (141, 142). In the case where a plurality of battery modules 100 are disposed side by side in the pack case 200, the plurality of battery modules 100 are disposed with their gas release planes 140 facing each other with a clearance 241 therebetween. Moreover, the battery pack 10 further includes the cover members 500, closing the upper end openings 242 formed at the upper ends of the clearances 241.

With this configuration, gases released from the gas release planes 140 do not rise directly to the upper portion of the inside of the pack case 200 since the upper end openings 242 of the clearances 241 are closed by the cover members 500. This can keep the top of the pack case 200 from becoming hot. Hence, the on-vehicle component 600, disposed in proximity to the top of the pack case 200, can be prevented from being thermally deteriorated.

Some adjacent battery modules 100 have different height dimensions due to the difference in number of unit cells 110 stacked, and some cover members 500 include the third plate portion 521, extending upwards and facing a gas release plane 140 of the taller one of the battery modules 100.

With this configuration, even when adjacent battery modules 100 have different height dimensions, a gas released from the gas release plane 140 is prevented from rising directly to the upper portion of the inside of the pack case 200 by the cover member 500 including the third plate portion 521. This can keep the top of the pack case 200 from becoming hot. Hence, the on-vehicle component 600, disposed in proximity to the top of the pack case 200, can be prevented from being thermally deteriorated.

(Modifications)

Figure 5A:
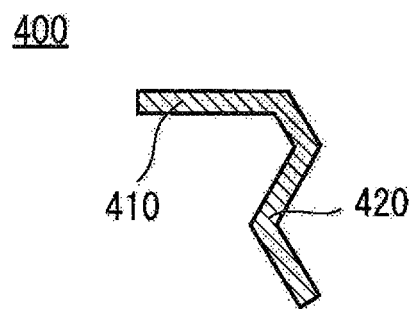
FIG. 5A is a cross-sectional view illustrating a modification of restriction plates.
Figure 5B:
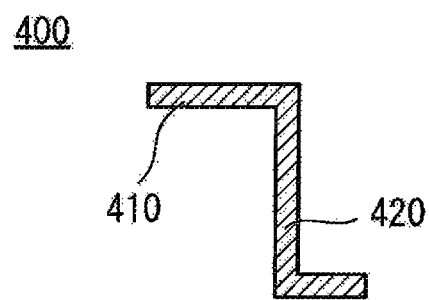
FIG. 5B is a cross-sectional view illustrating a modification of the restriction plates.

FIGS. 5A and 5B are cross-sectional views illustrating modifications of the restriction plates 400.

An embodiment in which each restriction plate 400 has a substantially L-shape has been presented. However, the shape of each restriction plate 400 is not limited to this case. The shapes of the first plate portion 410 and the second plate portion 420 of each restriction plate 400 can be modified as appropriate as long as they can keep a gas released from a gas release plane 140 from rising directly to the upper portion of the inside of the pack case 200.

For example, the second plate portion 420 of each restriction plate 400 may have a wavy shape as illustrated in FIG. 5A. Alternatively, the entirety of each restriction plate 400 may have a substantially Z-shape as illustrated in FIG. 5B.

The present application is based on Japanese Patent Application No. 2017-106701, filed on May 30, 2017, the entire disclosure of which is incorporated herein by reference.

REFERENCE SIGNS LIST 10 battery pack
100 battery module
110 unit cell
120 module case
140 gas release plane
143 upper edge of gas release plane
200 pack case
201 sidewall portion of pack case
210 lower case
220 upper case
230 sealing portion
231 sealing member
240 space
241 clearance
242 upper end opening
400 restriction plate
410 first plate portion
411 front edge
420 second plate portion
500 cover member
510 first cover member
520 second cover member
521 third plate portion
600 on-vehicle component

The invention claimed is:

1. An on-vehicle battery pack comprising:
   a battery module comprising:
      a unit cell; and a module case in which the unit cell is housed, the module case including an upper surface, a lower surface, and a lateral surface other than the upper surface and the lower surface, wherein a gas release plane from which to release a gas discharged from the unit cell is set on the lateral surface of the module case;

a pack case in which the battery module is housed, the pack case including a sidewall portion, an inner surface of the sidewall portion facing the gas release plane of the module case with a space therebetween; and a restriction plate which keeps the gas released from the gas release plane from rising directly to an upper portion of inside of the pack case, wherein the restriction plate comprises a first plate portion fixed to the upper surface of the module case and protruding toward the sidewall portion of the pack case at a height position higher than at least an upper edge of the gas release plane, and a second plate portion extending downwards in the space continuously from a front edge of the first plate portion in a direction in which the first plate portion protrudes, a downward opening is provided between the gas release plane and a lower edge of the second plate portion, the downward opening is configured to allow the gas released from the gas release plane to pass downwards, an upward opening is provided between the lower edge of the second plate portion and the inner surface of the sidewall portion of the pack case, and the upward opening is configured to allow the gas which is passed through the downward opening to pass upward.

2. The on-vehicle battery pack according to claim 1, wherein the pack case comprises an upper case in a bottomed box shape opening on a lower side; a lower case in a bottomed box shape opening on an upper side; and a sealing portion at which outer peripheries of opening portions of the upper and lower cases are connected with a sealing member therebetween, the sealing member is interposed between the outer periphery of the opening portion of the upper case and the outer periphery of the opening portion of the lower case, and the second plate portion of the restriction plate extends to a position lower than the sealing portion.

3. The on-vehicle battery pack according to claim 1, wherein the restriction plate is fixed to the pack case.

4. The on-vehicle battery pack according to claim 1, wherein a plurality of the battery modules are disposed side by side in the pack case, each of the plurality of battery modules is equipped with the restriction plate, and the restriction plates are connected to each other.

5. The on-vehicle battery pack according to claim 1, wherein a plurality of the battery modules are disposed side by side in the pack case, the gas release planes of all of the plurality of battery modules face an inner surface of one of the sidewall portions.

6. An on-vehicle battery pack comprising:

a battery module with a unit cell housed in a module case, a specific plane of the module case being set as a gas release plane from which to release a gas discharged from the unit cell;

a pack case in which the battery module is housed; and a restriction plate which keeps the gas released from the gas release plane from rising directly to an upper portion of inside of the pack case, wherein the battery module is housed with the gas release plane facing an inner surface of a sidewall portion of the pack case with a space therebetween, the restriction plate comprises a first plate portion fixed to an upper surface of the module case and protruding toward the sidewall portion of the pack case at a height position higher than at least an upper edge of the gas release plane, and a second plate portion extending downwards in the space continuously from a front edge of the first plate portion in a direction in which the first plate portion protrudes, a downward opening is provided between the gas release plane and a lower edge of the second plate portion, the downward opening is configured to allow the gas released from the gas release plane to pass downwards, an upward opening is provided between the lower edge of the second plate portion and the inner surface of the sidewall portion of the pack case, the upward opening is configured to allow the gas which is passed through the downward opening to pass upward, a pair of opposite planes of the battery module are each set as the gas release plane, a plurality of the battery modules are disposed side by side in the pack case, the plurality of battery modules are disposed with gas release planes thereof facing each other with a clearance therebetween, and the on-vehicle battery pack further comprises a cover member closing an upper end opening formed at an upper end of the clearance.

7. The on-vehicle battery pack according to claim 6, wherein adjacent ones of the battery modules have different height dimensions due to a difference in number of the unit cells stacked, and the cover member comprises a third plate portion extending upwards and facing the gas release plane of a taller one of the battery modules.

* * * * *